(12) United States Patent
Fricke et al.

(10) Patent No.: US 11,248,679 B2
(45) Date of Patent: Feb. 15, 2022

(54) GEAR ASSEMBLY FOR A ROTARY CONNECTION OF A WIND TURBINE, A WIND TURBINE HAVING SAME AND A SEALING ELEMENT FOR SAME

(71) Applicant: Wobben Properties GmbH, Aurich (DE)

(72) Inventors: Werner Fricke, Aurich (DE); Rainer Schlüter, Aurich (DE)

(73) Assignee: Wobben Properties GmbH, Aurich (DE)

( * ) Notice: Subject to any disclaimer, the term of this patent is extended or adjusted under 35 U.S.C. 154(b) by 286 days.

(21) Appl. No.: 16/319,102

(22) PCT Filed: Jul. 5, 2017

(86) PCT No.: PCT/EP2017/066826
§ 371 (c)(1),
(2) Date: Jan. 18, 2019

(87) PCT Pub. No.: WO2018/015161
PCT Pub. Date: Jan. 25, 2018

(65) Prior Publication Data
US 2020/0332880 A1 Oct. 22, 2020

(30) Foreign Application Priority Data
Jul. 21, 2016 (DE) ...................... 10 2016 213 316.0

(51) Int. Cl.
*F16H 1/04* (2006.01)
*F16H 57/04* (2010.01)
*F16J 15/16* (2006.01)
*F16H 1/06* (2006.01)
(Continued)

(52) U.S. Cl.
CPC ............... *F16H 1/06* (2013.01); *F03D 80/70* (2016.05); *F16H 57/0423* (2013.01);
(Continued)

(58) Field of Classification Search
CPC .... F16H 1/06; F16H 57/0423; F16H 57/0431; F16H 57/0454; F16H 57/0456;
(Continued)

(56) References Cited

U.S. PATENT DOCUMENTS 5,379,662 A    1/1995  Livio
9,033,109 B2 * 5/2015  Segovia ............... F16H 57/0431
                                                           184/14
(Continued)

FOREIGN PATENT DOCUMENTS

CN    203730696 U    7/2014
CN    203809218 U    9/2014
(Continued)

*Primary Examiner* — Adam D Rogers
(74) *Attorney, Agent, or Firm* — Seed Intellectual Property Law Group LLP

(57) ABSTRACT

A gear arrangement, in particular for a rotary connection of a wind turbine, comprising a first gear, a second gear in engagement with the first gear, wherein in the engaged position a gap space is provided between a first tooth and a second tooth of the first gear and a tooth of the second gear, and a sealing element which seals off the gap space to prevent lubricant escape.

17 Claims, 6 Drawing Sheets

(51) Int. Cl.
*F03D 80/70* (2016.01)
*F16J 15/3284* (2016.01)
*F16H 57/02* (2012.01)

(52) U.S. Cl.
CPC ...... *F16H 57/0456* (2013.01); *F16J 15/3284* (2013.01); *F16C 2361/61* (2013.01); *F16H 57/0431* (2013.01); *F16H 57/0454* (2013.01); *F16H 2057/02078* (2013.01)

(58) Field of Classification Search
CPC ............. F16H 57/0469; F16H 57/0472; F16H 2057/02078; F03D 80/70; F16C 2361/61; F16J 15/3284
See application file for complete search history.

(56) References Cited

U.S. PATENT DOCUMENTS

2013/0192930 A1 8/2013 Segovia et al.
2015/0114756 A1 4/2015 Xu et al.

FOREIGN PATENT DOCUMENTS

| | | | |
|---|---|---|---|
| CN | 105134928 A | 12/2015 | |
| EP | 0585099 A1 | 3/1994 | |
| FR | 1064651 A | 5/1954 | |
| JP | 60168920 A * | 9/1985 | ......... F16H 57/0431 |
| WO | 2015/136058 A1 | 9/2015 | |

* cited by examiner

GEAR ASSEMBLY FOR A ROTARY CONNECTION OF A WIND TURBINE, A WIND TURBINE HAVING SAME AND A SEALING ELEMENT FOR SAME

BACKGROUND

Technical Field

The invention concerns a gear arrangement, in particular for a rotary connection of a wind turbine. The invention further concerns a wind turbine. The invention further concerns a sealing element for sealing off a gear arrangement in particular of a wind turbine. Furthermore the invention concerns a method of lubricating a gear arrangement of a wind turbine.

Description of the Related Art

Wind turbines are generally known. The use of gear arrangements for rotary connections of wind turbines is also generally known, at all those locations at which parts have to be moved with a rotational movement relative to each other. In the classic sense for example in relation to an azimuth bearing reference is made to a rotary connection. At that location the pod is rotated relative to the pylon. A further example of a rotary connection would be a pitch mounting of a rotor blade.

Gear arrangements of the above-indicated kind are subjected in operation to loadings inter alia by the drive producing the rotary movement. The teeth which are in engagement with each other, besides a rolling movement, always also generate a frictional movement relative to each other. Wear occurs at the locations of the tooth flanks in the gear arrangement, that are subjected to friction. In order to limit the wear, the gears of the gear arrangements are therefore lubricated in known fashion by the supply of lubricants. That is intended to prevent the friction which necessarily occurs and the wear that is linked thereto.

In particular in the case of the rotary connections which are known for wind turbines the wear of the gear arrangement is not regular. An example to be emphasized here, in connection with the invention, is the pitch mounting of the wind turbine. After the wind turbine is installed it is oriented in a preferential direction, from which the wind driving the wind turbine predominantly blows. The central tooth of the drive gear, that is in engagement with the driven gear, is also referred to as the "golden tooth". As that tooth is in engagement with the oppositely disposed gear more frequently than the other teeth of the driving gear the wear there is correspondingly greater. For that reason there is a particular need here to be able to supply sufficient lubricant. That equally applies generally for gear arrangements.

In the state of the art that has hitherto been managed by wetting the tooth or teeth which are to be lubricated with lubricant at very short lubrication intervals. For example systems are known, in which the tooth or teeth to be lubricated are supplied with lubricant by means of a lubricant supply arrangement fixedly installed on the gear arrangement through passages in the teeth, the lubricant then being introduced into the foot space of the respective gears.

It has been found however that after a very short time the lubricant introduced is expelled from the gap space between the interengaging gears again so that very short lubrication intervals and a very high level of lubricant consumption result. A further disadvantage which has been observed is that, for renewed lubrication of the gear arrangement location that is respectively involved, pivotal movement of the drive pinion of the gear arrangement in the driven rotary connection has to be effected through generally about 90 to 180° so that the pinion is accessible for the additional introduction of lubricant. This can involve considerable losses in power generation as for example in the case of a pitch mounting the rotor blades are outside of the preferred direction in relation to the wind as a consequence of the pivotal movement of the gear arrangement through an angle of 15 to 30° or more, and in that case only obtain very little to no power from the wind.

The above-described lubricating solutions in which lubricant is introduced through the teeth admittedly obviate those problems but are however structurally expensive and complicated.

BRIEF SUMMARY

Provided is a gear arrangement in which the lubricating characteristics and the capability of retaining lubricant are improved. The gear arrangement may reduce the wear of a golden tooth in the gear arrangement.

There is proposed a gear arrangement comprising a first gear, a second gear in engagement with the first gear, wherein in the engagement position a gap space is provided between a first tooth and a second tooth of the first gear and a second tooth of the second gear, and a sealing element which is arranged between the first gear and the second gear and seals off the gap space to prevent lubricant escape. It is to be appreciated that, irrespective of the kind of tooth arrangement, there is always a small gap space between the mutually meshing teeth of the first and second gears of the gear arrangement. In the normal situation the lubricant escapes through that gap. Provided herein is the available gap space is closed outwardly by means of the introduction of a sealing element between the first gear and the second gear at precisely the location at which wear is preferably to be minimized. The sealing element which preferably comprises a compressible material is compressed in the gap space as a consequence of engagement between the first and second gears and closes the gap space so that previously introduced lubricant can no longer escape through the gap space. A surprisingly great improvement in the wear performance has been found to occur by virtue of using the lubricant.

Advantageous developments and preferred embodiments of the gear arrangement are set forth in the appendant claims and the description hereinafter. Thus in a first preferred embodiment a development of the gear arrangement provides that the sealing element has a first sealing lip, a second sealing lip substantially parallel to the first sealing lip and rests on the first gear in such a way that the first sealing lip is seated at a flank of a first tooth and the second sealing lip is seated at a flank, that is towards the flank of the first tooth, of a second tooth adjacent to the first tooth. Thus the first and second sealing lips form a seal to prevent radial escape of lubricant between the teeth when a tooth of the second gear is in engagement between the first and second teeth of the first gear.

Further preferably the sealing element has a third sealing lip and a fourth sealing lip substantially parallel to the third sealing lip and rests on the first gear in such a way that the third and fourth sealing lips extend at least portion-wise along the flanks of the first and second teeth of the first gear and connect the first and second sealing lips together. Preferably the third and fourth sealing lips are oriented at an angle of 90°+/−5°. Accordingly the third and fourth sealing lips in engagement with the tooth of the second gear between the first and second teeth of the first gear form a seal to prevent lubricant from axially escaping. Particularly preferably the sealing element has the first, second, third and fourth sealing lips.

In a preferred configuration the third and fourth sealing lips are respectively connected to an end portion of the first and second sealing lips so that they jointly provide an integral sealing element. The third and fourth sealing lips are of such dimensions that in engagement with the tooth of the second gear they project axially on both sides and at least portion-wise surround the tooth of the second gear at the end. In that configuration the common tooth engages as it were into a pocket formed by the sealing element.

In a particularly preferred configuration the sealing element has a recess for receiving lubricant into the region of the root circle diameter of the first gear, in particular delimited by the first, second, third and fourth sealing lips. Insofar as the first, second, third and fourth sealing lips define and delimit the recess between them, the recess serves as a pocket for receiving the lubricant. The pocket preferably surrounds the region in opposite relationship to the engagement of the tooth of the second gear, that engages into the recess. That configuration is particularly advantageous for the reason that the recess is already accessible from the outside upon very slight pivotal movement of the first and second gears relative to each other. Just a few degrees of pivotal movement are sufficient in order to provide sufficient gap space between the gears that a cannula or similar discharge means of a lubricant application device can be introduced for supplying lubricant between the gears in order to introduce lubricant into the recess and thus into the region of the root circle diameter of the first gear. The recess is closed upon pivotal movement into the engagement position between the first tooth of the second gear and the first and second teeth of the first gear and the lubricant can perform its lubricating task without being pressed axially and/or radially out of the engagement relationship by the mutually meshing teeth of the first and second gears.

An embodiment of the invention is particularly preferably intended for use at that location in the gear arrangement, at which the golden tooth is arranged. In operation it is not always immediately apparent from the outside, which of the teeth of the gear in question constitutes the golden tooth. Therefore a preferred embodiment proposes that the first gear further has at least one third tooth and a fourth tooth, which are arranged in adjacent relationship at both sides of the first and second teeth, and the second gear further has at least a second and third tooth which are arranged in adjacent relationship at both sides of the first tooth, wherein in the engagement position a respective gap space is provided between the corresponding teeth of the first gear and the second gear, and the sealing element seals off the gap space respectively to prevent lubricant escape. The portions of the sealing element for the third and fourth teeth of the first gear which are respectively in engagement with the second and third teeth of the second gear are of an identical configuration as described hereinbefore in relation to the first and second teeth of the first gear and the first tooth of the second gear. A plurality of first and second sealing lips, preferably connected with further third and fourth sealing lips respectively, bear against mutually facing, oppositely disposed flanks of adjacent teeth, are brought, in engagement with the respective second or third tooth of the second gear, into contact in sealing relationship with the respective tooth and thus seal off the gap space remaining between the gears to prevent lubricant escape.

After the golden tooth has been identified the further portions of the sealing element preferably serve as reserve sealing elements. If the portion of the sealing element which seals off the golden tooth against lubricant loss is worn the sealing element merely has to be displaced by one tooth and operation can be continued.

The configuration of the sealing element for sealing off a plurality of teeth also predestines the sealing element for use on driven rotary connections like for example that of cranes and the like.

As is already apparent from the foregoing therefore in further preferred embodiments the sealing element has a corresponding number of further first, second, third and fourth sealing lips, wherein the first and second sealing lips are substantially parallel to each other and the third and fourth sealing lips are substantially parallel to each other.

The first, second, third and fourth sealing lips also bear for the further teeth against the first gear in such a way that the first sealing lips sit on a respective flank of the first, second, third and fourth tooth and the second sealing lips sit on a respectively facing flank of the adjacent tooth, and the third and fourth sealing lips extend at least portion-wise along the flanks of the first, second, third and fourth tooth of the first gear and connect the respective first and second sealing lips together.

In this embodiment in regard to the further portions of the sealing element the gear arrangement is preferably of the configuration as set forth hereinbefore in relation to the foregoing embodiments.

In a preferred configuration the first and fourth sealing lips are connected together by means of a bar which extends at the end along the first gear and preferably fixes the sealing element axially to the first gear.

The third sealing lips are therefore preferably connected together by means of a first bar while the fourth sealing lips are preferably connected together by means of a second bar. The first and second bars reliably prevent the sealing element from slipping down from the first gear in the axial direction.

In a preferred configuration the sealing element comprises one of the following materials: polyurethane (PUR), silicone rubber, fluorosilicone rubber, fluoro rubber, acrylate rubber, perfluoro rubber, polychloroprene rubber, chlorosulphonated polyethylene rubber, polyester urethane rubber, butyl rubber, natural rubber, ethylene propylene diene rubber (EPDM), nitrile rubber (NBR), hydrated nitrile rubber (HNBR), APTK, Viton or a combination of a plurality of those materials.

Preferably the sealing element is of a Shore-A hardness in a range of 20 to 90, preferably in a range of 30 to 65. The Shore-A hardness is determined for example in accordance with DIN EN ISO 868:2003-10 or ISO 7610-1:2012-02.

In a second aspect, as mentioned in opening part of this specification, the invention concerns a wind turbine. In particular, one embodiment is directed to a wind turbine, with a rotary connection, in particular a pitch rotary connection for rotor blade angle adjustment, and a gear arrangement for driving the rotary connection, wherein preferably the first gear is a ring gear and the second gear is a drive pinion and wherein moreover preferably the tooth of the second gear and the first and second teeth of the first gear in an engagement position of the gear arrangement are in engagement with each other, insofar as the gear arrangement is in accordance with one of the above-described preferred embodiments. In regard to the advantages achieved and preferred embodiments attention is directed in that respect to the foregoing description relating to the gear arrangement.

By the wind turbine being provided with such a gear arrangement according to the invention it enjoys the corresponding advantages.

In a third aspect the invention also concerns the sealing element for sealing off a gear arrangement itself.

One embodiment is directed to proposing the use of a sealing element for sealing off a gear arrangement, wherein the sealing element can be arranged between a first gear and a second gear in engagement with the first gear, wherein in the engagement position a gap space is provided between a first tooth and a second tooth of the first gear and a tooth of the second gear and wherein the sealing element is adapted to seal off the gap space to prevent lubricant escape.

A development of the sealing element is preferably in accordance with one of the above-described preferred embodiments which have been set forth hereinbefore in relation to the gear arrangement. The sealing element makes a crucial contribution to improved retention capacity for lubricant between the teeth of the gear arrangement.

As mentioned in the opening part of this specification, in a fourth aspect the invention concerns a method of lubricating the gear arrangement of a wind turbine. In that respect the wind turbine is particularly designed in accordance with one of the above-described preferred embodiments. The method attains the stated object by including the steps: pivoting the gear arrangement through a predetermined angular amount so that the gap space between the first and second teeth of the first gear and the tooth of the second gear is accessible, preferably through less than 15°, particularly preferably through 2° or less, feeding lubricant into the gap space, in particular by means of a lubricant application device which either is arranged permanently opening with its outlet opening into the gap space or which is introduced with its outlet opening into the gap space, and pivoting the gear arrangement back through the predetermined angular amount so that the sealing element seals off the gap space.

Preferably introduction of the outlet opening into the gap space is synchronized with the pivotal movement of the gear arrangement in such a way that, when the predetermined angular range of the pivotal movement of the gear arrangement is exceeded, lubricant is automatically introduced into the gap space by the outlet opening (which is either permanently disposed there or intermittently introduced into the gap space) of the lubricant application device, a predetermined amount of lubricant is discharged into the gap space, it is removed from the gap space and then the return pivotal movement of the gear arrangement takes place.

Further preferably that operation is repeated in automated fashion and at predetermined time intervals. By virtue of the only very slight pivotal angle required, only a very low level of power generation loss has to be tolerated in each such operation. It is thus possible and preferred for the above-described operation, also referred to as "lubricating mode", to be repeated at time intervals of 2 hours or shorter, further preferably 1 hour or shorter, particularly preferably 30 minutes or shorter.

BRIEF DESCRIPTION OF THE SEVERAL VIEWS OF THE DRAWINGS

The invention is described in greater detail hereinafter with reference to the accompanying Figures by means of a preferred embodiment. In the Figures.

DETAILED DESCRIPTION

Figure 1:
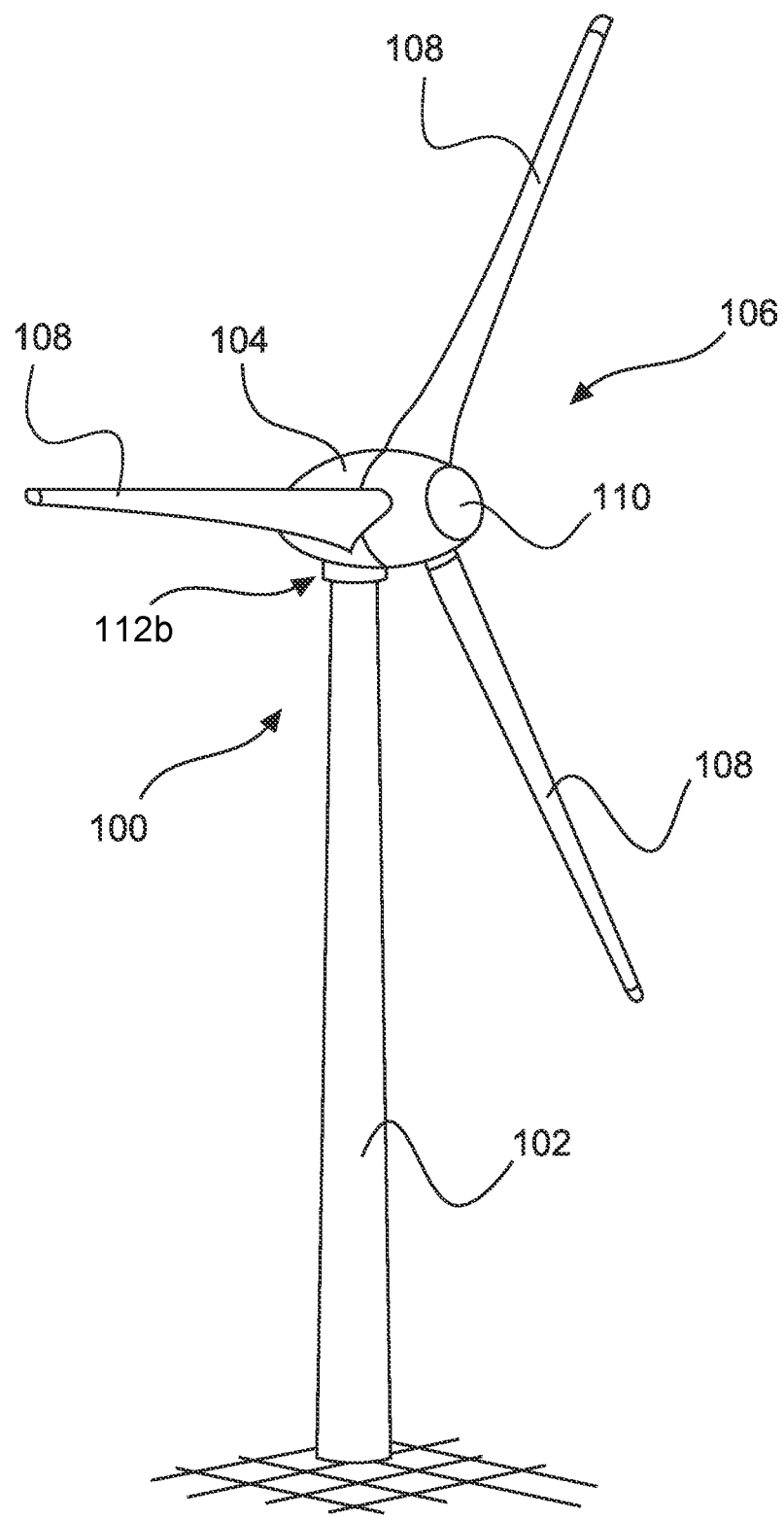
FIG. 1 shows a diagrammatic perspective view of a wind turbine according to the present invention.

FIG. 1 shows a diagrammatic view of a wind turbine 100 according to the invention. The wind turbine 100 has a pylon 102 and a pod 104 on the pylon 102. Provided on the pod 104 is an aerodynamic rotor 106 having three rotor blades 108 and a spinner 110. In operation of the wind turbine 100 the aerodynamic rotor 106 is caused to rotate by the wind and thus also rotates a rotor or rotor member (not shown) of a generator which is directly or indirectly coupled to the aerodynamic rotor 106. The electric generator is arranged in the pod 104 and generates electric power. The generator is preferably in the form of a slowly rotating synchronous generator.

Figure 2A:
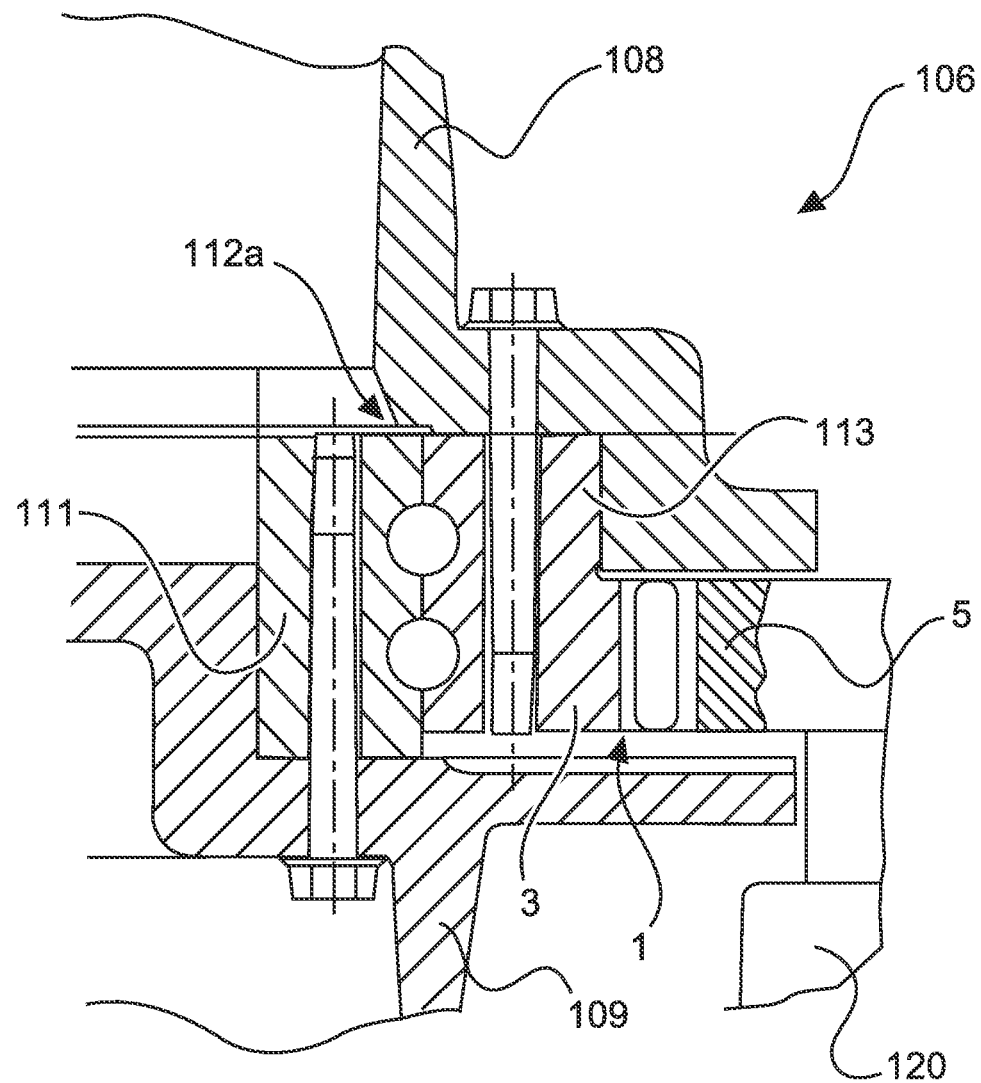
FIG. 2a shows a diagrammatic cross-sectional view of the connection between a rotor hub and a rotor blade of the wind turbine of FIG. 1.

The rotor 106 has a rotor hub 109 to which the rotor blades 108 are mounted by means of a first rotary connection 112a in the form of a pitch rotary connection respectively. FIG. 2a shows such a pitch rotary connection. The first rotary connection has a first bearing ring 111 which is fixed to the rotor hub 109 and a second bearing ring 113 connected to a rotor blade 109. The first rotary connection 112a is operatively connected to a gear arrangement 1 by a first gear 3 being non-rotatably connected to the rotor blade and by a second gear 5 being arranged at the hub side as a drive pinion. The drive pinion 5 is preferably driven by means of a drive unit 120.

The pod 104 is connected to a pylon 102 by means of a second rotary connection 112b.

Figure 2B:
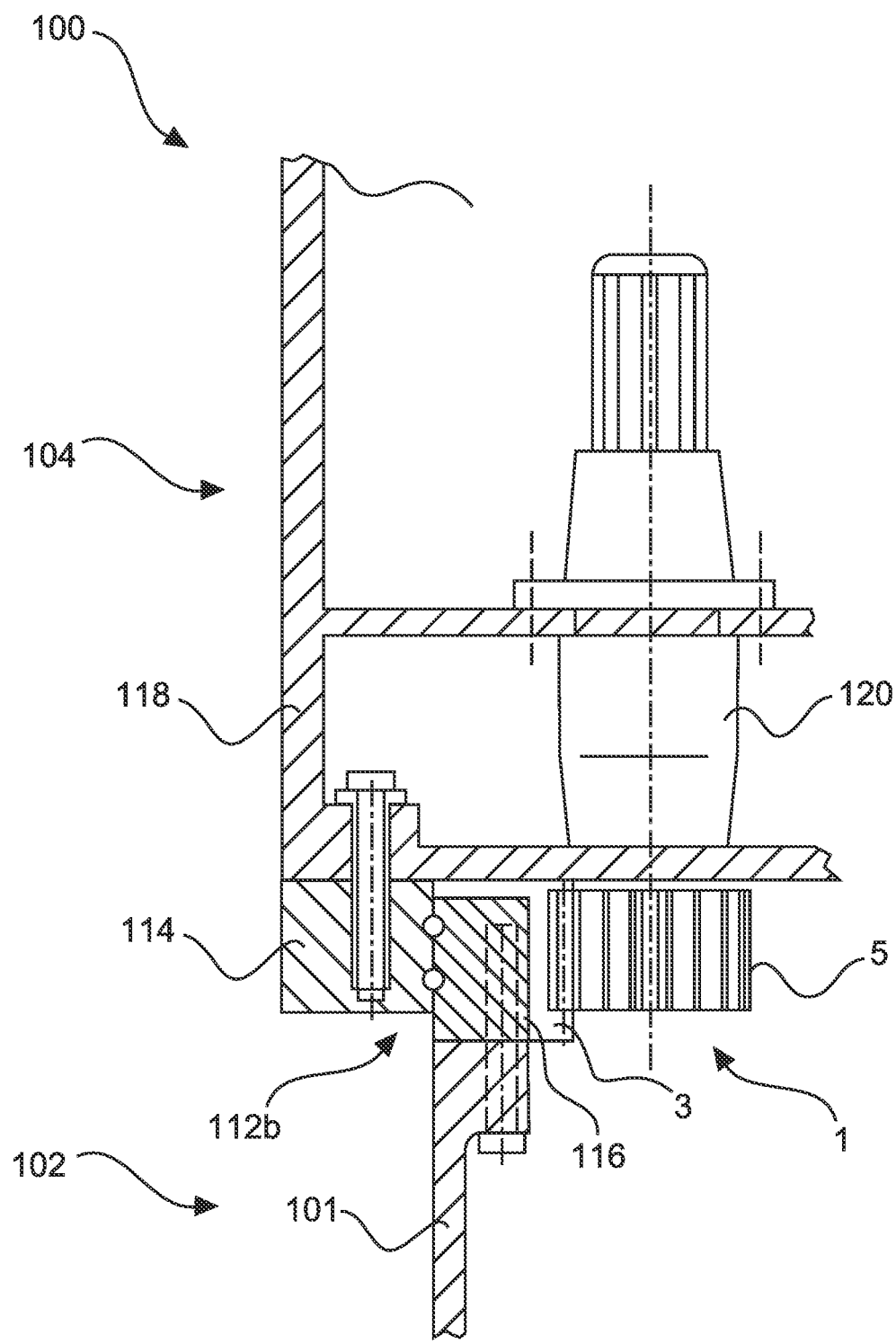
FIG. 2b shows a diagrammatic cross-sectional view of the connection between a pylon and a pod of the wind turbine of FIG. 1.

FIG. 2b shows a second rotary connection 112b of the wind turbine 100 in detail. The rotary connection 112b has a first bearing ring 114 fixed to a carrier structure 118 of the pod 104. In addition the rotary connection 112b has a second bearing ring 116 connected to a shaft end 101 of the pylon 102.

The rotary connection 112b is operatively connected to a gear arrangement 1 by a first gear 3 which is in the form of a gear ring being fixed at the pylon side to the rotary connection 112b and by a second gear 5 in the form of a drive pinion being arranged at the pod side on the rotary connection 112b. The drive pinion 5 is preferably driven by means of a drive unit 120. The wind turbine 100 can optionally have a plurality of such drive units 120 and a plurality of second gears 5 which are in engagement with the first gear 3 in order to produce a rotational movement of the pod 104 relative to the pylon 102. To clearly illustrate the essence of the invention hereinafter only one gear arrangement having a first gear 3 and a second gear 5 will be discussed in detail, in which respect the teaching can also be applied in corresponding fashion to a plurality of gear arrangements 1 on the wind turbine 100.

Figure 3:
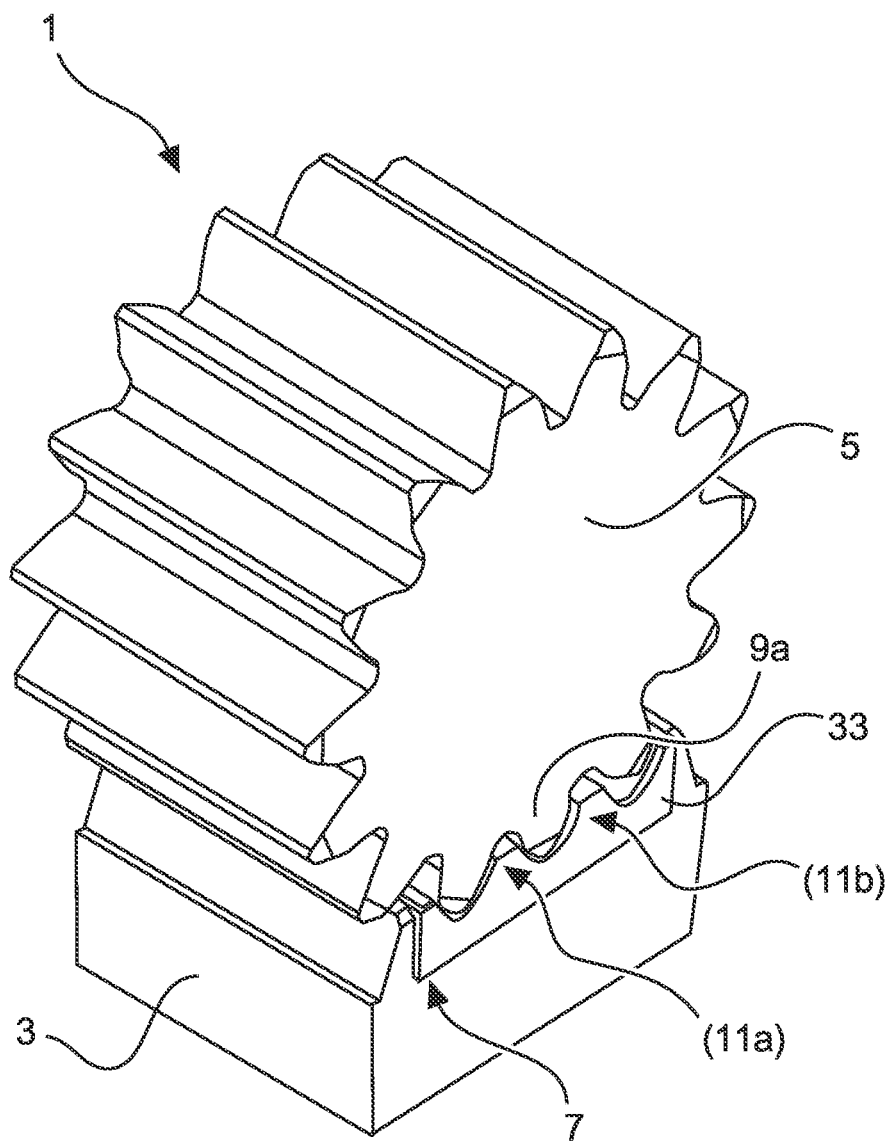
FIG. 3 shows a gear arrangement according to the invention for a wind turbine as shown in FIGS. 1 and 2a, b.

As can be seen from FIG. 3 the second gear 5 has a first tooth 9a which in the present embodiment is to be assumed to be the so-called "golden tooth". The gear arrangement 1 is disposed in the engagement condition shown in FIG. 3 for the predominant time in operation of the wind turbine 100 (FIG. 1).

In the position shown in FIG. 3 the tooth 9a of the second gear 5 is in engagement between a first tooth 11a and a second tooth 11b of the first gear 3. In a mirror image-reversed configuration of the gear arrangement 1, in which therefore the first gear would be the drive pinion, the tooth 11a or 11b, for example, would be golden tooth. Moreover the gear arrangement additionally has at the respective other gear a second golden tooth so that it is also possible to refer to a "golden tooth pair". Usually the pinion is markedly harder than the driven gear ring so that wear phenomena occur more at the ring gear. In addition the ring gear can only be replaced with difficulty so that protection thereof is a matter of priority.

Figure 4:
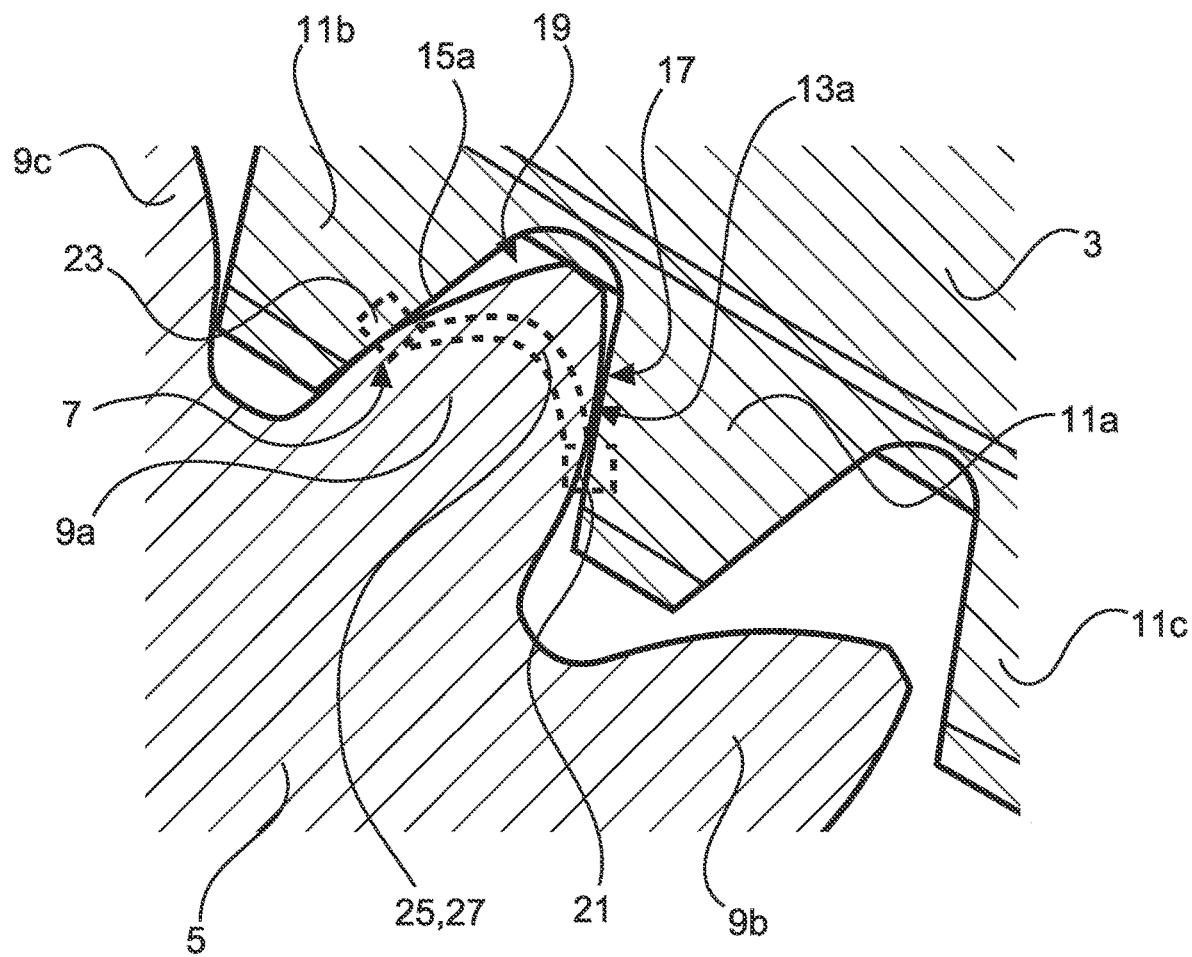
FIG. 4 shows a detail view relating to the gear arrangement of FIG. 3.

A gap space is defined between the first tooth 9a of the second gear 5 and the first and second teeth 11a, b of the second gear 3 (FIG. 4). In addition disposed on the first gear 3 is a sealing element 7 which is compressed in engagement by the second gear 5 and seals off the gap space to prevent lubricant escape in the axial and radial directions. Details in regard thereto will be apparent from the following Figures.

FIGS. 3 and 4 show by way of example the engagement situation as between the first gear 3 and the second gear 5, and also the arrangement in principle of the sealing element 7. Provided between the tooth 9a of the second gear 5 and two mutually facing tooth flanks 13a, 15a of the first and second teeth 11a, 11b of the first gear 3 is the gap space 17 which extends substantially from the location of the engagement between the two gears 3, 5 into a foot region 19 of the first gear 3. In operation lubricant like for example lubricating grease is disposed in that space. In a condition without the sealing element 7 the lubricating grease could escape in the radial direction along the tooth flanks 13a, 15a and in the axial direction laterally from the gap space 17. To prevent that the sealing element 7 is inserted between the first and second gears 3, 5 in such a way that a first sealing lip 21 sits between the tooth 9a of the second gear 5 and the flank 13a of the second tooth 11a of the first gear 3 and a second sealing lip 23 is arranged at an oppositely disposed side of the first tooth 9a of the second gear 5 between the tooth 9a and the flank 15a of the second tooth 11b. The sealing lips 21, 23 are compressed by the teeth 11a, 9a, 11b of the gears 3, 5 and seal off the gap space 17 to prevent lubricant escape in the radial direction.

In addition the sealing element 7 has a third and a fourth sealing lip 25, 27 which are respectively connected to an end region of the first and second sealing lips 21, 23 and bear at an edge region of the second gear 5 sealingly against the flanks 13a, 15a and the tooth 9a. That prevents lubricant escape from the gap space 15 outwardly in the axial direction.

It will also be apparent from FIG. 4 that a pivotal movement of the gear arrangement 1 through a few degrees from the position shown in FIG. 4 already provides that the sealing gap is no longer sealingly closed but is opened to such an extent that an outlet opening of a lubricant application device can be introduced into the gap space 17 in order to deposit lubricant there.

For reasons of greater clarity FIG. 4 only shows the sealing element in engagement with the tooth 9a and the teeth 11a, 11b of the gears 5, 3. The same concept however can also be transferred to the adjacent second and third teeth 9b, 9c of the second gear and the third and fourth teeth 11c, 11d of the first gear 3, that are adjacent to the first and second teeth 11a, 11b, as shown in FIG. 5, and for any further tooth of the gear arrangement 1.

Figure 5:
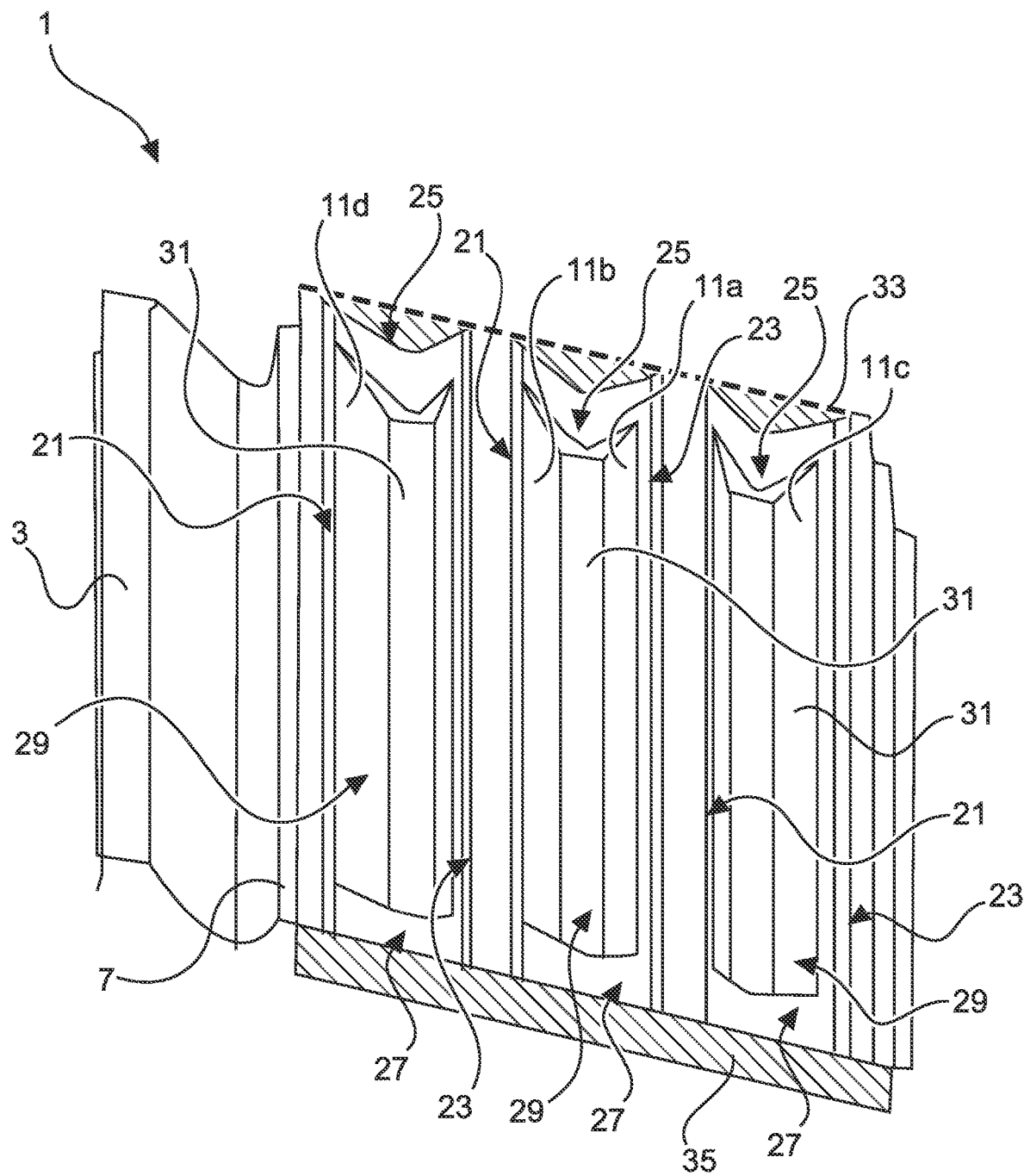
FIG. 5 shows a diagrammatic perspective view of a sealing element for a gear arrangement according to the foregoing Figures.

As can be clearly seen from FIG. 5 a recess 29 is provided in the sealing element 7, more specifically being respectively delimited by a first sealing lip 21, a second sealing lip 23, a third sealing lip 25 and a fourth sealing lip 27. There are overall three such recesses 29. The recesses 29 serve as pockets or lubricant storage configurations. In order further to improve the structural integrity of the sealing element the third sealing lips 25 are respectively connected to the fourth sealing lips 27 by means of a plurality of bars 31 which can optionally be additionally provided as sealing lips in the foot region of the first gear 3.

For axially fixing the sealing element 7 on the first gear 3, provided on both sides of the gear 3 at the ends of the sealing element 7 are respective bars 33, 35 which connect the third sealing lips 35 together and which connect the fourth sealing lips 27 together.

The fourth and third sealing lips 25, 27 are preferably spaced from each other and are of a respective width such that they overlap laterally in the axial direction at the ends of the second gear 5 (see FIG. 3 by way of indication). Accordingly the sealing lips also embrace the second gear 5 at the end and additionally enhance the sealing action in relation to axial lubricant escape.

In operation the lubricating method is preferably carried out as follows:

After the sealing element 7 has been fitted on to the gear 3 for setting up operational capability thereof and the recesses 29 have been supplied with lubricant the gear arrangement 1 is pivoted into the operative position so that the first tooth 9a or golden tooth engages into the recess 29 between the first tooth 11a and the second tooth 11b of the first gear 3. The sealing element 7 seals off the gap space 17 in relation to lubricant escape as long as the tooth 9a is in a condition of engagement. If the wind direction changes (in the case of an azimuth rotary connection) or if the pitch angle is altered (in the case of a pitch rotary connection) slightly, the tooth 9a moves out of engagement, but in return one of the two teeth 9b, 9c, or silver teeth, comes into engagement between either the third tooth 11c and the first tooth 11a or the fourth tooth 11d and the second tooth 11b. The gap space which occurs there is sealed off in the same manner as described hereinbefore.

For re-supplying the recesses 29 with lubricant a lubricating travel mode is preferably carried out. In the so-called lubricating mode the gear arrangement 9 is moved out of its previous position by a few degrees, preferably less than 15°, particularly preferably less than 2°. Lubricant is then introduced through an outlet opening into one of the recesses which were previously in engagement laterally by means of a lubricant application device, for example a cannula or the like, which is specifically introduced for that purpose or which alternatively is arranged permanently on the gear arrangement. After introduction has been effected lubricant is fed into the respective recess 29. If this does not involve a permanently arranged device the lubricant application device is removed again and the gear arrangement 1 is pivoted back into the previous position. That synchronized procedure is preferably to be repeated at predetermined lubricating intervals.

After the service life of the sealing element 7 is reached the sealing effect can be restored involving a very low level of working implementation by one-time pivotal movement of the gear arrangement 1 through an adequate angular amount away from the first gear 3 and—in an embodiment having a plurality of recesses 29—by simple displacement by a tooth, or in the case of total wear, by fitting a fresh sealing element 7.

The sealing element 7 which preferably comprises a compressible material can be manufactured in large numbers at low cost and can be stored in a condition requiring a small amount of space in order if necessary to be rapidly available for replacement.

The invention claimed is:

1. A gear arrangement, for a rotary connection of a wind turbine, comprising:
   a first gear, and a second gear in engagement with the first gear, wherein when the first gear is in an engaged position with the second gear a gap space is provided between a first tooth and a second tooth of the first gear and a tooth of the second gear; and
   a sealing element arranged between the first gear and the second gear, the sealing element being configured to seal a portion of the gap space to prevent lubricant from escaping therethrough,
   wherein the sealing element has:
     a first sealing lip, and
     a second sealing lip substantially parallel to the first sealing lip, and
   wherein the sealing element rests on the first gear in such a way that the first sealing lip is seated at a flank of the first tooth, and the second sealing lip is seated at a flank, that is towards the flank of the first tooth, of the second tooth adjacent to the first tooth.

2. The gear arrangement according to claim 1 wherein:
   the sealing element has a third sealing lip and a fourth sealing lip substantially parallel to the third sealing lip, and
   the sealing element rests on the first gear in such a way that the third and fourth sealing lips extend at least portion-wise along the flanks of the first and second teeth of the first gear and connect the first and second sealing lips together.

3. The gear arrangement according to claim 2 wherein the third and fourth sealing lips are respectively connected to an end portion of the first and second sealing lips.

4. The gear arrangement according to claim 2 wherein the third and fourth sealing lips are of such dimensions that when in engagement with the tooth of the second gear, the third and fourth sealing lips project axially on both sides and at least portion-wise surround the tooth of the second gear at an end.

5. The gear arrangement according to claim 2 wherein the sealing element has a recess for receiving the lubricant into a region of a root circle diameter of the first gear and delimited by the first, second, third and fourth sealing lips.

6. The gear arrangement according to claim 2 wherein the gap space is a first gap space, wherein:
   the first gear has at least one third tooth and a fourth tooth, which are arranged in adjacent relationship at both sides of the first and second teeth,
   the second gear has at least a second and third tooth, which are arranged in adjacent relationship at both sides of the first tooth,
   in the engaged position a second gap space is provided between the corresponding teeth of the first gear and the second gear, and
   the sealing element seals off the second gap space to prevent lubricant escape.

7. The gear arrangement according to claim 6 wherein:
   the first and second sealing lips are substantially parallel to each other, and
   the third and fourth sealing lips are substantially parallel to each other.

8. The gear arrangement according to claim 7 wherein the third and fourth sealing lips are connected together by a bar that extends at an end along the first gear and fixes the sealing element axially to the first gear.

9. The gear arrangement according to claim 7 wherein the sealing element comprises one of the following materials: polyurethane (PUR), silicone rubber, fluorosilicone rubber, fluoro rubber, acrylate rubber, perfluoro rubber, polychloroprene rubber, chlorosulphonated polyethylene rubber, polyester urethane rubber, butyl rubber, natural rubber, ethylene propylene diene rubber (EPDM), nitrile rubber (NBR), hydrated nitrile rubber (HNBR), APTK, Viton or a combination of a plurality of the previously mentioned materials.

10. The gear arrangement according to claim 6 wherein the first, second, third and fourth sealing lips bear against the first gear in such a way that:
    the first sealing lip sits on a respective flank of the first, second, third and fourth tooth and the second sealing lip sits on a respectively facing flank of the adjacent tooth, and
    the third and fourth sealing lips extend at least portion-wise along the flanks of the first, second, third and fourth teeth of the first gear and connect the respective first and second sealing lips together.

11. A wind turbine, comprising:
    a rotary connection, and the gear arrangement according to claim 1 for driving the rotary connection.

12. The wind turbine according to claim 11, wherein the first gear is a ring gear and the second gear is a drive pinion, wherein the tooth of the second gear and the first and second teeth of the first gear are in engagement with each other in an engaged position of the gear arrangement.

13. The wind turbine according to claim 11, wherein the rotary connection is an azimuth rotary connection for a pod angle adjustment or a pitch rotary connection for a rotor blade angle adjustment.

14. A method of lubricating a gear arrangement of a wind turbine, the method comprising:
    pivoting the gear arrangement through a predetermined angular amount to a first engaged position, wherein the gear arrangement comprises a first gear and a second gear in engagement with the first gear, wherein the first engaged position provides a gap space between first and second teeth of the first gear and a tooth of the second gear,
    feeding lubricant into the gap space, and
    pivoting the gear arrangement back through the predetermined angular amount so that a sealing element seals off the gap space, the sealing element arranged between the first gear and the second gear, the sealing element being configured to seal a portion of the gap space to prevent lubricant from escaping therethrough,
    wherein the sealing element has a first sealing lip, and a second sealing lip substantially parallel to the first sealing lip, and wherein the sealing element rests on the first gear in such a way that the first sealing lip is seated at a flank of the first tooth, and the second sealing lip is seated at a flank, that is towards the flank of the first tooth, of the second tooth adjacent to the first tooth.

15. The method according to claim 14, wherein the predetermined angular amount is less than 15°.

16. The method according to claim 14, wherein feeding lubricant into the gap space comprises securing a lubricant application device so that the lubricant application device is arranged with an outlet opening directed to the gap space.

17. A sealing element for sealing a gear arrangement, wherein the sealing element is arranged between a first gear and a second gear in engagement with the first gear, wherein in the engagement position, a gap space is provided between a first tooth and a second tooth of the first gear and a tooth of the second gear, and wherein the sealing element is adapted to seal off the gap space to prevent lubricant escape,
 wherein the sealing element has:
  a first sealing lip, and
  a second sealing lip substantially parallel to the first sealing lip, and
 wherein the sealing element rests on the first gear in such a way that the first sealing lip is seated at a flank of the first tooth and the second sealing lip is seated at a flank, that is towards the flank of the first tooth, of the second tooth adjacent to the first tooth.

* * * * *